US012684671B2

(12) United States Patent
Hu et al.

(10) Patent No.: US 12,684,671 B2
(45) Date of Patent: Jul. 14, 2026

(54) IMAGE CONVERSION TO LIGHTING CONTROL MAP FOR PERIPHERAL DEVICE

(71) Applicant: Hewlett-Packard Development Company, L.P., Spring, TX (US)

(72) Inventors: Jung-Hao Hu, Hsinchu (TW); Chih-Wei Chan, Hsinchu (TW); Shih-Hao Liu, Hsinchu (TW); Carl Ng, Fountain Valley, CA (US); Chih-Hung Wu, Hsinchu (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 309 days.

(21) Appl. No.: 18/498,659

(22) Filed: Oct. 31, 2023

(65) Prior Publication Data

US 2025/0142703 A1 May 1, 2025

(51) Int. Cl.

| | |
|---|---|
| ***G09G 3/20*** | (2006.01) |
| ***H05B 47/105*** | (2020.01) |
| ***H05B 47/155*** | (2020.01) |
| ***H05B 47/165*** | (2020.01) |

(52) U.S. Cl.

CPC ......... *H05B 47/105* (2020.01); *H05B 47/155* (2020.01); *H05B 47/165* (2020.01)

(58) Field of Classification Search

CPC .. H05B 47/105; H05B 47/155; H05B 47/165; G09G 3/20; G09G 3/2088; G09G 3/3216; G09G 3/3225; G09G 3/3611; G09G 3/3622; G09G 3/3644; G06F 3/0219; G06F 3/0481; G06F 9/4411; A63F 13/26; H04M 1/22; H04M 1/0283; H01H 13/83; H01H 2219/039

See application file for complete search history.

(56) References Cited

U.S. PATENT DOCUMENTS

| | | | | |
|---|---|---|---|---|
| 10,212,793 | B1 * | 2/2019 | Plancherel | H01H 13/83 |
| 10,499,479 | B1 * | 12/2019 | Plancherel | H05B 45/20 |
| 2010/0306683 | A1 * | 12/2010 | Pance | G06F 3/0219 715/764 |
| 2012/0306751 | A1 * | 12/2012 | Massaro | G06F 3/0219 345/168 |
| 2018/0368230 | A1 * | 12/2018 | Chen | H05B 45/20 |
| 2020/0201449 | A1 * | 6/2020 | Korte | G06F 3/0219 |
| 2024/0004671 | A1 * | 1/2024 | Al-Joundi | H05B 47/18 |

* cited by examiner

*Primary Examiner* — Rodney Amadiz
(74) *Attorney, Agent, or Firm* — Quarles & Brady LLP

(57) ABSTRACT

A computing device is electronically connectable to a peripheral device. The computing device may convert an image into a lighting control map and output the lighting control map to the peripheral device. The peripheral device controls lights on the peripheral device in a manner that causes the lights to illuminate in accordance with the lighting control map.

20 Claims, 13 Drawing Sheets

FIG. 1D
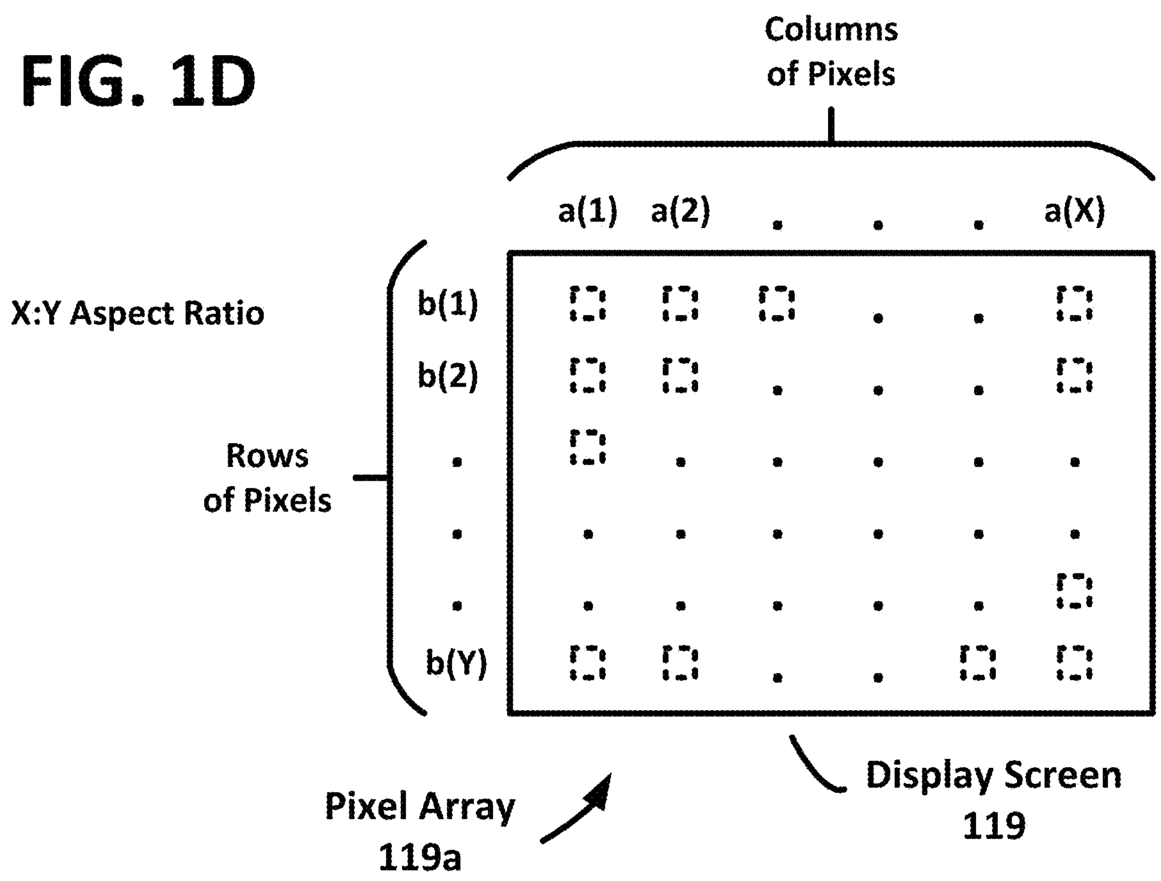
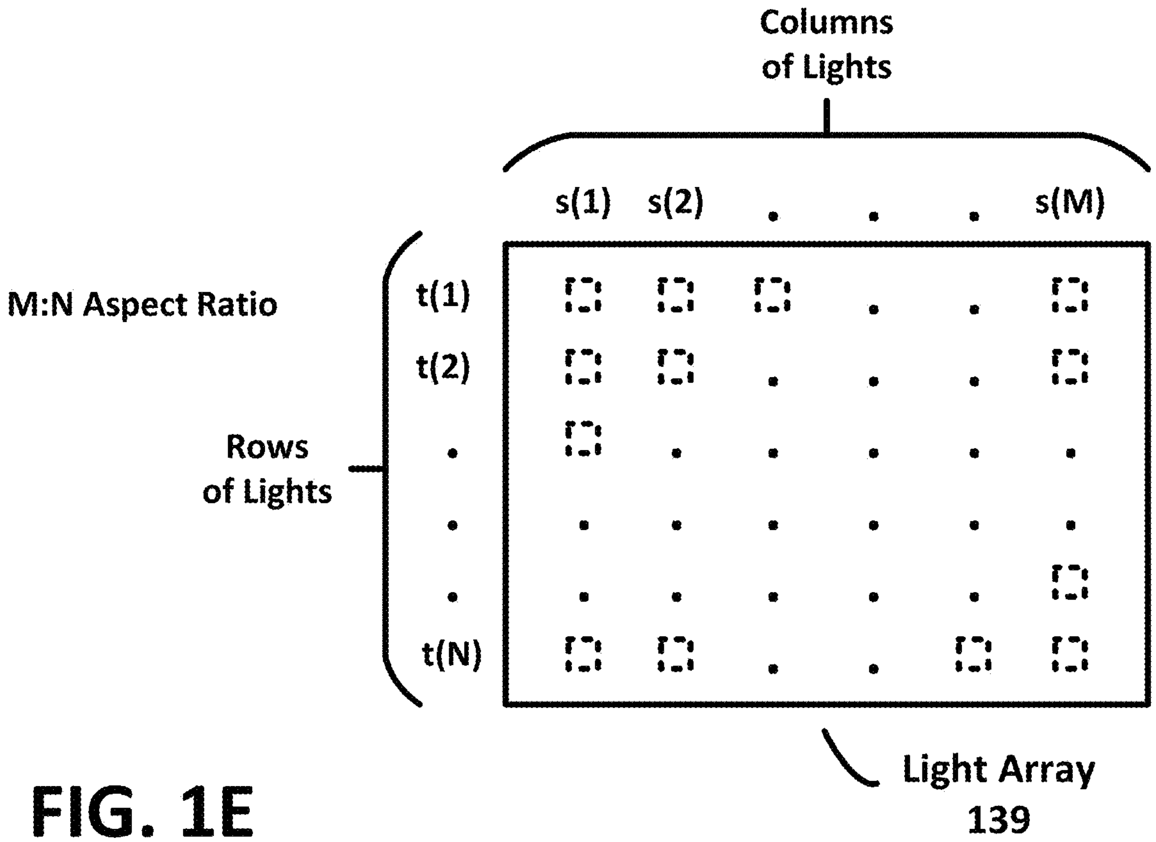
FIG. 1E

IMAGE CONVERSION TO LIGHTING CONTROL MAP FOR PERIPHERAL DEVICE

BACKGROUND

A user may use a peripheral device to interface with a computing device. The computing device can control ambient lighting emitted from the peripheral device.

BRIEF DESCRIPTION OF THE DRAWINGS

The accompanying drawings, which are incorporated in and form a part of this specification, illustrate examples of the disclosure and, together with the description, explain principles of the examples. In the drawings, like reference symbols and numerals indicate the same or similar components.

FIG. 1D illustrates an example pixel array for a display screen in the computing device of FIG. 1B.

FIG. 1E illustrates an example light array for a peripheral device of FIG. 1C.

DETAILED DESCRIPTION

Figure 1A:
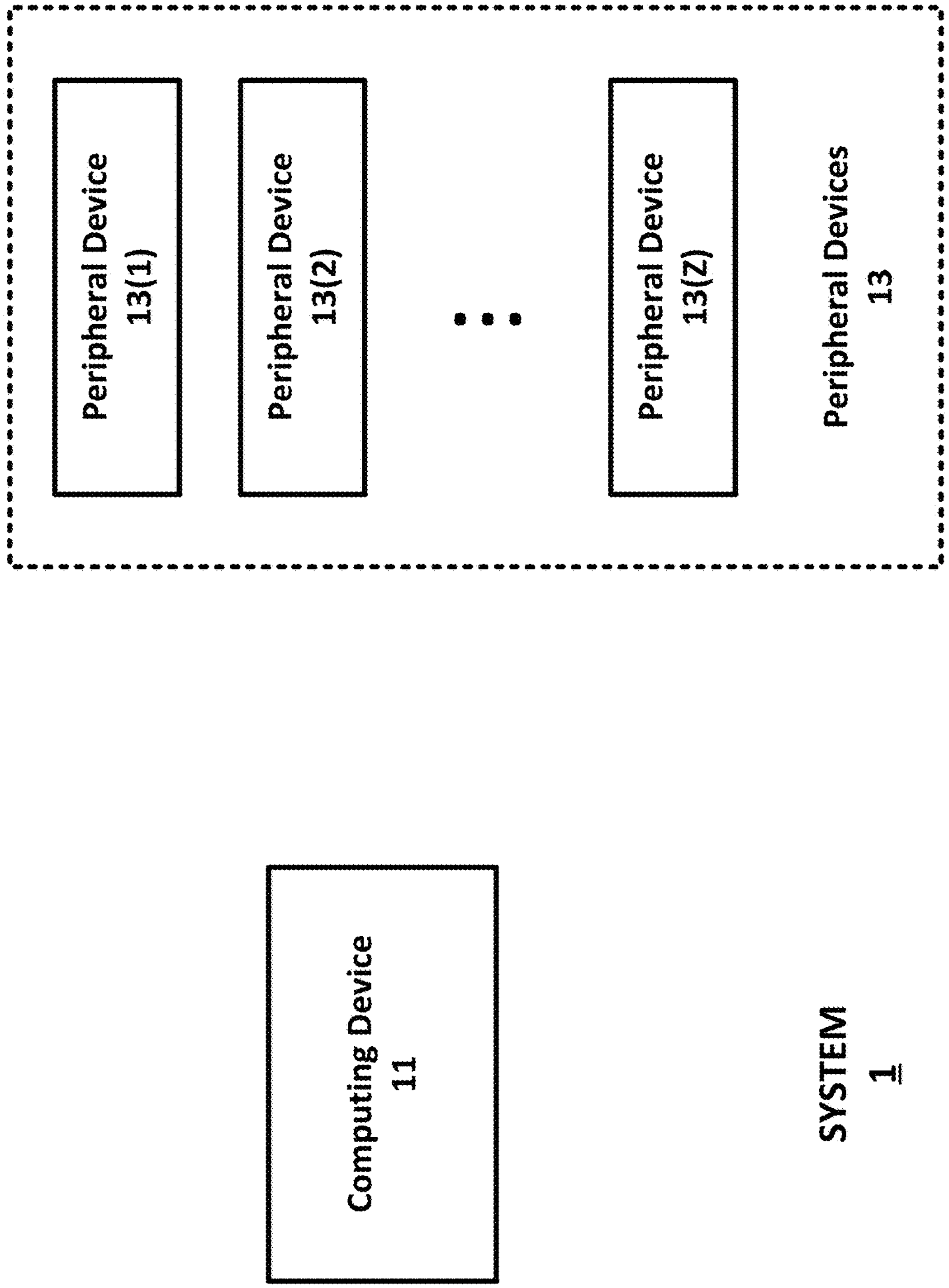
FIG. 1A illustrates a system comprising an example computing device and an example peripheral device, according to the present disclosure.

Embodiments of the disclosure are described in detail below with reference to the accompanying figures. Unless otherwise indicated, like parts and method steps are referred to with like reference numerals.

A peripheral device may electronically connect to a processing device so as to permit a user, when operating the peripheral device, to interact with the processing device. While connected to the peripheral device, the processing device may control the peripheral device in a manner that causes the peripheral device to create lighting effects. Lighting effects may include ambient lighting that the peripheral device emits for aesthetic purposes. Processing devices may restrict the types of lighting effects created by the peripheral device to a predetermined number of lighting effects, for example, as a result of a limited amount of lighting effects that can be produced by software of the processing device.

Described herein is a computing device that is electronically connectable to a peripheral device. The computing device may convert an image into a lighting control map and output the lighting control map to the peripheral device. The computing device may obtain the image for converting into the lighting control map from various sources, including displayed content, computer-generated content, or recorded content. In some examples, the computing device may convert the image into the lighting control map while the image is on the display screen. The image may be a still image. Likewise, the image may be an image frame of a video stream having a plurality of image frames. The peripheral device may create lighting effects by illuminating lights on the peripheral device according to the lighting control map so as to cause the lights on the peripheral device to irradiate in accordance with the image.

Accordingly, in some examples, systems, apparatuses, methods, and computer readable media storing instructions for execution are provided herein for a computing device that enables users to customize the lighting effects emitted from peripheral device based on the images that may appear on the display screen of the computing device. This and other features described herein provide unique lighting features for users to further enhance their experience through peripheral lighting. For example, by controlling lighting effects on the peripheral device to track or mirror content of an image on a display, the system may provide a more immersive experience for a user. As another example, by controlling lighting effects on the peripheral device according to an image from various sources, the system provides a more customized experience. By outputting the lighting control map to the peripheral device, the computing device may control the peripheral device to create a wide variety of lighting effects.

The following describes technical solutions with reference to accompanying drawings. Example embodiments are described in detail with reference to the accompanying drawings. For the sake of clarity and conciseness, matters related to the present embodiments that are well known in the art have not been described.

FIG. 1A illustrates a system 1. The system 1 includes an example computing device 11 and example peripheral devices 13. The peripheral devices 13 may include peripheral devices 13(1)-13(Z), with "Z" being an integer number of greater than 1.

Figure 1B:
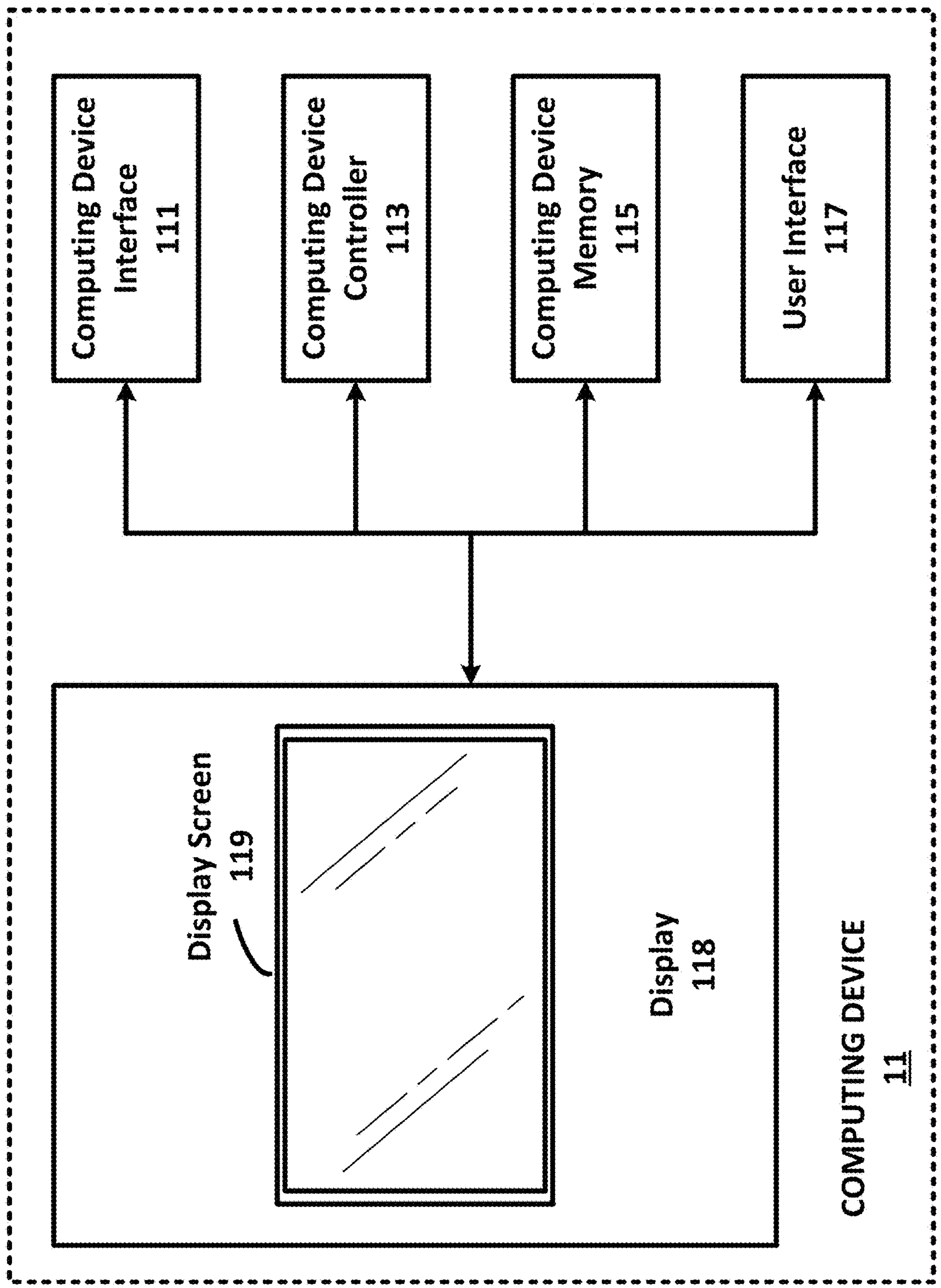
FIG. 1B illustrates the example computing device of FIG. 1A.

FIG. 1B illustrates the computing device 11. In some examples, the computing device 11 may be a computer such as a notebook computer, a desktop computer, a workstation, an all-in-one (AIO) computer, or another type of computing device such as a mobile device, e.g., smartphone, or a wearable computing device, e.g., smartwatch. The computing device 11 may include a computing device interface 111, a computing device controller 113, computing device memory 115, a user interface 117, a display 118, and a display screen 119.

The computing device controller 113 may control the computing device 11. The computing device controller 113 may be implemented as any suitable processing circuitry including, but not limited to at least one of a microcontroller, a microprocessor, a single processor, and a multiprocessor. The computing device controller 113 may include at least one of a video scaler integrated circuit (IC), an embedded controller (EC), a central processing unit (CPU), a graphics processing unit (GPU), an accelerated processing unit (APU), an application specific integrated circuit (ASIC), field programmable gate arrays (FPGA), or the like, and may have a plurality of processing cores.

Computing device memory 115 may be a non-transitory processor readable or computer readable storage medium. Computing device memory 115 may comprise read-only memory ("ROM"), random access memory ("RAM"), other non-transitory computer-readable media, or a combination thereof. In some examples, computing device memory 115 may store firmware. Computing device memory 115 may store software for the computing device 11. The software for the computing device 11 may include program code. The program code includes program instructions that are readable and executable by the computing device controller 113, also referred to as machine-readable instructions. Computing device memory 115 may store filters, rules, data, or a combination thereof.

Figure 1C:
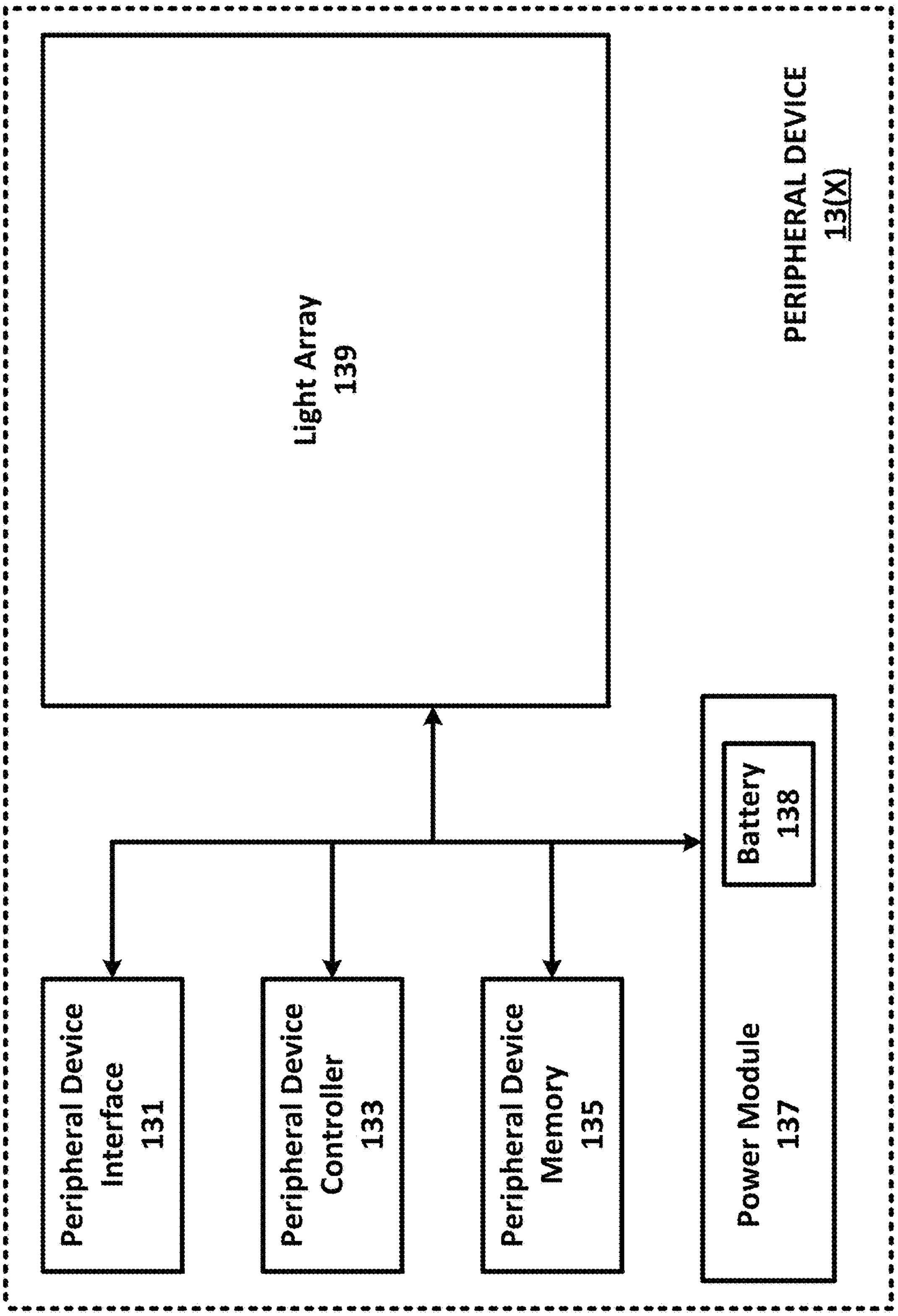
FIG. 1C illustrates the example peripheral device of FIG. 1A.

FIG. 1C illustrates a peripheral device 13(X). The peripheral device 13(X) may be any one of the peripheral devices 13(1)-13(Z) in FIG. 1A. The peripheral device 13(X) may be keyboard, a computer mouse, a headset, a speaker, a microphone, a lamp, a desktop or computer tower, a fan, a heatsink, a memory module, a liquid cooling pump, or any other apparatus with a matrix of lights. The peripheral device 13(X) may be any part or component that has lighting or illumination capabilities. In some examples, the part or component may be integrated into the computing device 11. In other examples, the part or component may be external to the computing device 11.

As illustrated in FIG. 1C, the peripheral device 13(X) may include a peripheral device interface 131, a peripheral device controller 133, peripheral device memory 135, a power module 137, and a light array 139.

The peripheral device interface 131 may communicate by wire or wirelessly with the computing device interface 111 in the computing device 11 such that the computing device 11 and the peripheral device 13(X) are in electronic communication. The computing device interface 111 and the peripheral device interface 131 may employ communication protocols such as Universal Serial Bus (USB), USB-C, Bluetooth, infrared technology and/or other connectivity protocols. While the peripheral device 13(X) is in communication with the computing device 11, the peripheral device controller 133 may control the peripheral device interface 131 to exchange configuration information between the computing device interface 111 and the peripheral device interface 131.

In some examples, only one peripheral device 13(X) may be in electronic communication with the computing device interface 111. In other examples, the device interface 111 may be in electronic communication with any number of the peripheral devices 13(1)-13(Z).

The peripheral device controller 133 may control the peripheral device 13(X). The peripheral device controller 133 may include a central processing unit (CPU), a graphic processing unit (GPU), a microprocessor, an application specific integrated circuit (ASIC), field programmable gate arrays (FPGA), or the like, and may have a plurality of cores.

Peripheral device memory 135 may be a non-transitory processor readable or computer readable storage medium. Peripheral device memory 135 may comprise read-only memory ("ROM"), random access memory ("RAM"), other non-transitory computer-readable media, or a combination thereof. In some examples, peripheral device memory 135 may store firmware. Peripheral device memory 135 may store software for the peripheral device 13(X). The software for the peripheral device 13(X) may include program code. The program code includes program instructions that are readable and executable by the peripheral device controller 133. Peripheral device memory 135 may store filters, rules, data, or a combination thereof.

The power module 137 may supply power or electrical energy to the peripheral device interface 131, the peripheral device controller 133, the peripheral device memory 135, and the light array 139. The power module 137 may wirelessly receive the power from the computing device 11. The power module 137 may receive the power from the computing device 11 by a wired connection with the computing device 11. The power module 137 may receive the power from the computing device 11 through the peripheral device interface 131.

The power module 137 may include a battery 138. The battery 138 may be removable from the power module 137. The battery may store power or electrical energy as potential energy when the power module 137 receives such power from the computing device 11. The battery 138 may be a rechargeable battery. As a rechargeable battery, the battery 138 may be repeatedly charged with the power when some or all of the potential energy stored in the battery 138 has been discharged from the battery 138.

FIG. 1D illustrates a pixel array 119*a* of the display screen 119. As illustrated in FIG. 1D, individual pixels in the pixel array 119*a* may be arranged as a matrix of pixels having columns a(1)-a(X) and rows b(1)-b(Y) of the pixels, with "X" being an integer number greater than 1 and "Y" being another integer number greater than 1. A display screen aspect ratio is an aspect ratio of the display screen 119. The display screen 119 may have the display screen aspect ratio of X:Y.

The pixel array 119*a* of the display screen 119, when operating, may present an image for viewing. When the pixel array 119*a* presents the image for viewing, the display screen 119 may display the image. The image is viewable when the display screen 119 displays the image. The image may be a still image. The image may be a single image. Likewise, the image may be an image frame of a video stream having a plurality of image frames. The plurality of image frames of the video stream may be a sequence of images, or consecutive images, that, during playback, are displayed in succession by the display screen 119. The plurality of image frames of the video stream may be displayed in succession at a frame rate, for example, at 10 frames per second (fps), 24 fps, 30 fps, 60 fps, or another rate. The computing device controller 113 may control the pixel array 119*a* to display the image or images. The display screen 119 may be a liquid crystal display. The display screen 119 may be a light-emitting diode (LED) display. The light-emitting diode display may be an organic light-emitting diode (OLED) display.

FIG. 1E illustrates an example of the light array 139 of the peripheral device 13(X). As illustrated in FIG. 1E, lights in the light array 139 of the peripheral device 13(X) may be arranged as a matrix of lights having columns s(1)-s(M) and rows t(1)-t(N) of the lights, with "M" being an integer number and "N" being another integer number. A light (or each light) in the light array 139 may be incorporated into a mechanical button and/or a mechanical switch. For example, the mechanical switch may be switch key of a keyboard when the peripheral device 13(X) is a keyboard. In such an example, the light array 139 may be incorporated into a matrix of switch keys such that each switch key corresponds to a light of the light array 139, each light of the light array 139 corresponds to a switch key, or both. As another example, the mechanical switch may be a mouse button of a computer mouse when the peripheral device 13(X) is a computer mouse. Although the light array 139 of FIG. 1D is illustrated as a matrix of lights having a regular grid pattern, in some examples, the lights of the light array 139 are organized in a non-grid pattern. Additionally, in some examples, the lights of the light array 139 are organized in a grid pattern, but with gaps or spaces within the grid in which no lights are present.

A light array aspect ratio is an aspect ratio of the light array 139 in the peripheral device 13(X). The light array 139 may have the light array aspect ratio of M:N. The display screen aspect ratio for the display screen 119 may differ from the light array aspect ratio for the peripheral device 13(X). Likewise, the light array aspect ratio for another of the peripheral devices 13(1)-13(Z) may differ from the light array aspect ratio for the peripheral device 13(X). In some examples, the pixel array 119*a* of the display screen 119 has more pixels than the light array 139 has lights. For example, the pixel array 119*a* of the display screen 119 may have a 720×480 matrix (where 720 is the number of columns and 480 is the number of rows), 720×576 matrix, 1280×720 matrix, 1920×1080 matrix, 3840×2160 matrix, 7680×4320 matrix, among other matrix sizes. The light array 139 of the peripheral device 13(*x*), in some examples, may have a matrix of lights with fewer than 200, 100, 50, or 25 rows and columns. In some examples, the pixel array 119*a* has more or fewer pixels than these examples. In some examples, the light array 139 has more or fewer lights than these examples.

A light in the light array 139 may be a light-emitting diode (LED), an organic light-emitting diode (OLED), and/or any other light source that is capable of emitting multiple colors of light. Each light in the light array 139 may emit multiple colors of light. For example, each light may include a red-green-blue (RGB) pixel controllable (e.g., by the peripheral device controller 133) to emit a particular color at a given moment (e.g., based on a control signal thereto). Each RGB pixel, in some examples, may include a red sub-pixel, green sub-pixel, and blue sub-pixel. The peripheral device controller 133 may control the sub-pixels to emit various combinations and levels of red, green, and blue light to produce various colors.

Figure 1F:
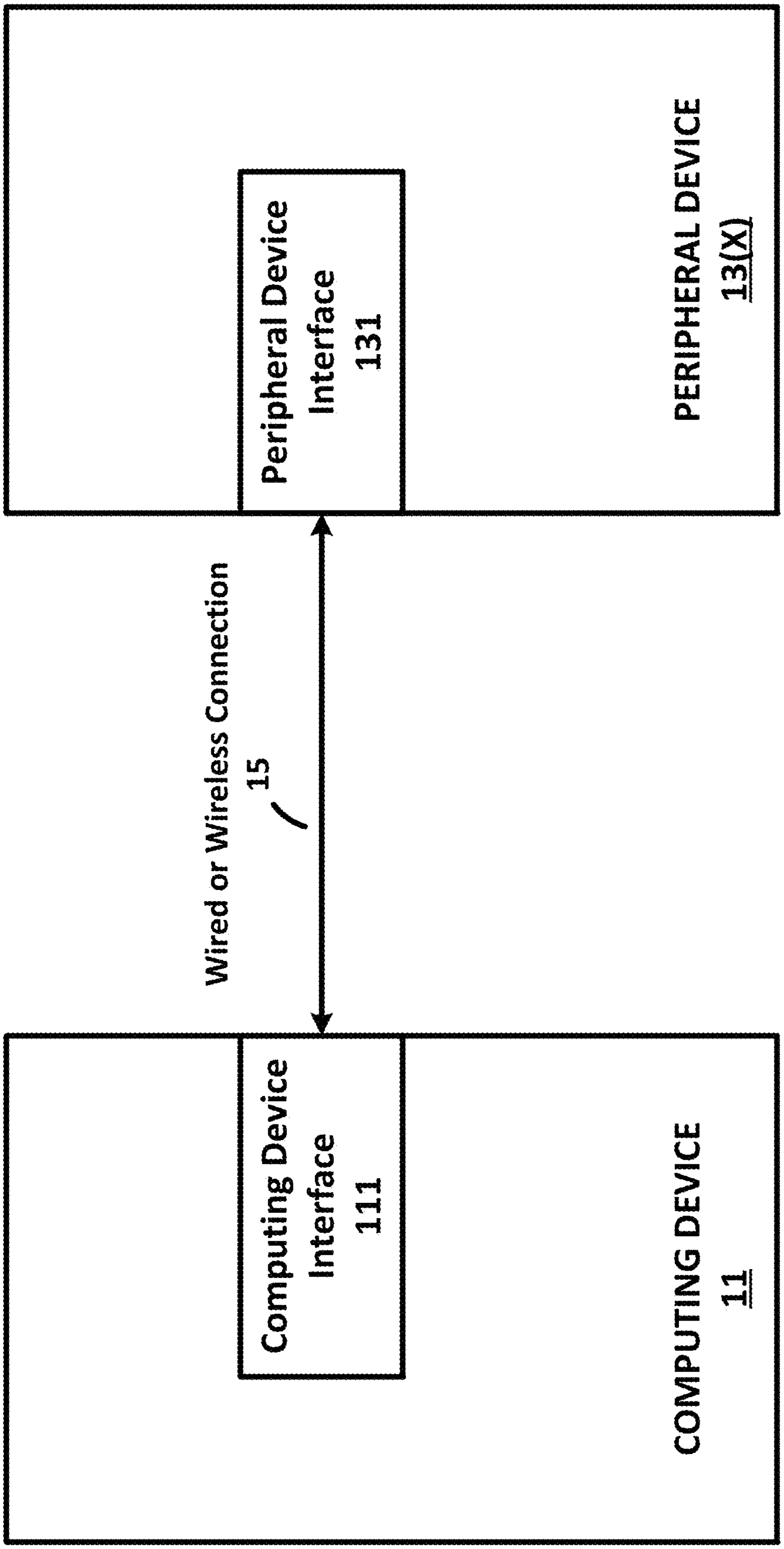
FIG. 1F illustrates the example computing device of FIG. 1B in communication with the example peripheral device of FIG. 1C.

FIG. 1F illustrates an example where the computing device 11 is in communication with the peripheral device 13(X). The computing device interface 111 in the computing device 11 may communicate by a wired or wireless connection 15 between the peripheral device interface 131 and the computing device interface 111 such that the computing device 11 and the peripheral device 13(X) may be in electronic communication.

Figure 1G:
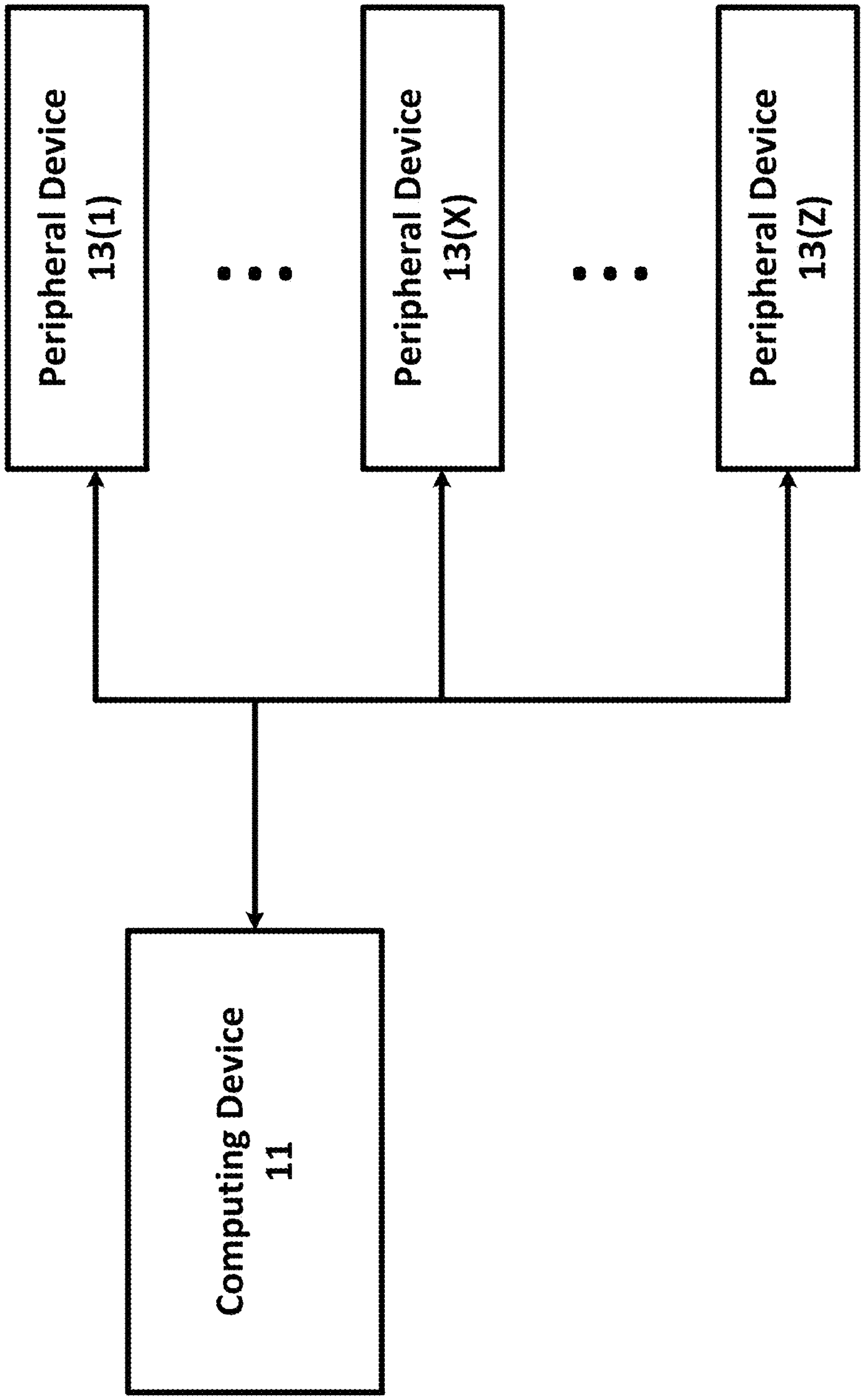
FIG. 1G illustrates the example computing device of FIG. 1B in communication with multiple example peripheral devices.

FIG. 1G illustrates an example where the computing device 11 is simultaneously in communication with the multiple peripheral devices 13(1)-13(Z). The multiple peripheral devices 13(1)-13(Z) may be electrically connected to computing device 11 directly and/or indirectly. The peripheral device 13(X) in FIG. 1G is one of the multiple peripheral devices 13(1)-13(Z).

Figure 2A:
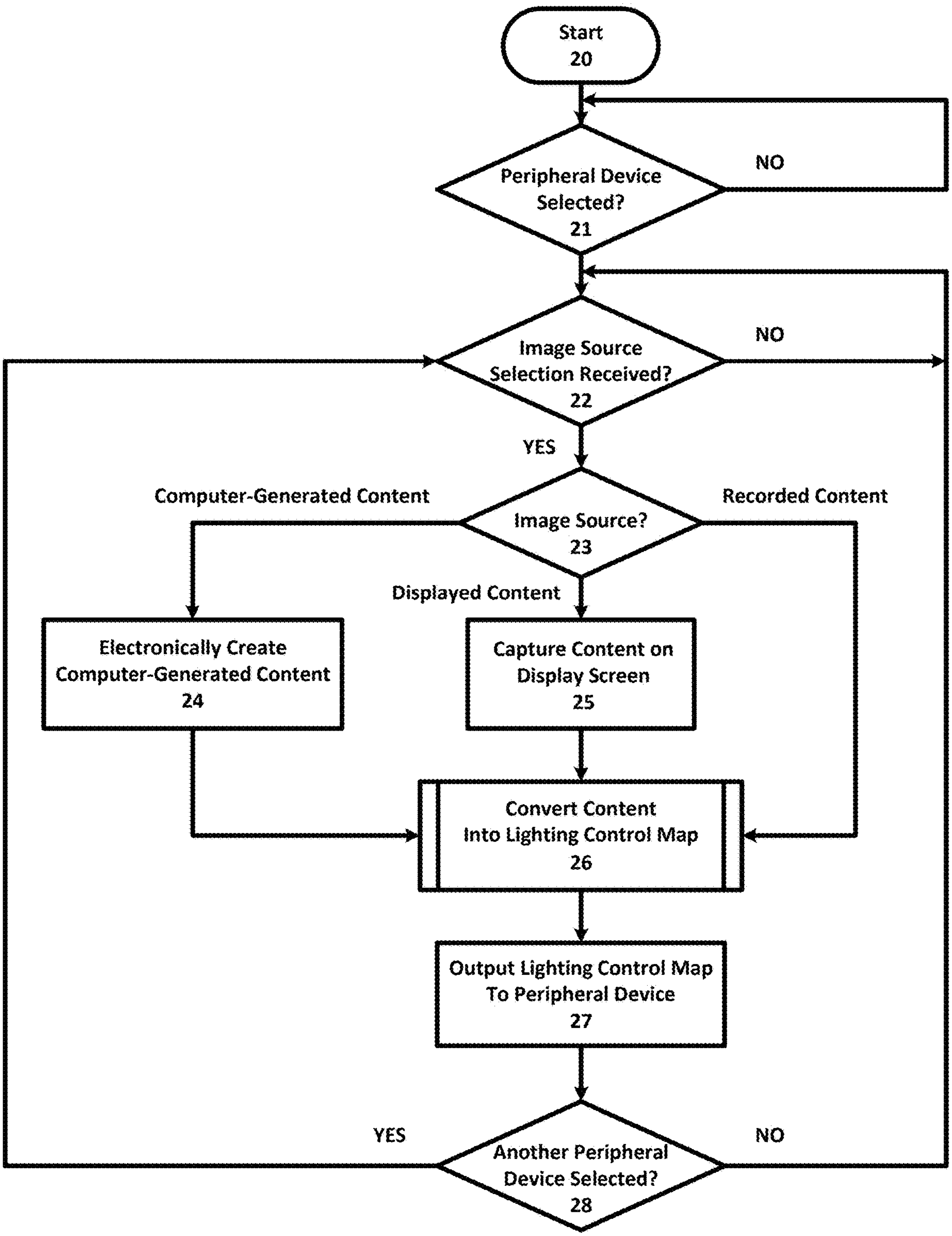
FIG. 2A illustrates a flow diagram for lighting effects processing performed by the computing device, according to examples of the present disclosure.

FIG. 2A illustrates a flow diagram for lighting effects processing performed by the computing device controller 113. Lighting effects processing, generally, comprise techniques that may cause the peripheral device 13(X) to emit light as lighting effects via the light array 139 for purposes other than to illuminate an area surrounding the peripheral device 13(X). For example, the peripheral device 13(X) may emit the light as lighting effects via the light array 139 mainly for aesthetic purposes such as to provide decorative lighting and/or accent lighting.

In the flow diagram of FIG. 2A, the computing device controller 113 may control the computing device 11 to perform the lighting effects processing of FIG. 2A. Software that is stored in the non-transitory processor readable computing device memory 115 may include the program instructions that are executable by the computing device controller 113. The computing device controller 113 may execute the program instructions. When executing the program instructions, the computing device controller 113 may perform lighting effects processing for the computing device 11. When executed by the computing device controller 113, the software stored in the computing device memory 115 may instruct the computing device controller 113 to perform the lighting effects processing illustrated in FIG. 2A.

The lighting effects processing in FIG. 2A begins at block 20 when any of the peripheral devices 13(1)-13(Z) is electrically connected to and/or in communication with the computing device 11. For example, in FIG. 1F, the computing device 11 is in communication with the peripheral device 13(X). The computing device 11 may be in communication with the peripheral device 13(X) when electrically connected by wire or wirelessly to the peripheral device 13(X). While in communication with the peripheral device 13(X), the computing device controller 113 may control the computing device interface 111 to exchange configuration information between the peripheral device interface 131 and the computing device interface 111. The computing device interface 111 may receive, in the configuration information from the peripheral device interface 131, the light array aspect ratio for the light array 139 of peripheral device 13(X) and identification information that uniquely identifies the peripheral device 13(X).

Thereafter, the lighting effects processing in FIG. 2A may advance from block 20 to block 21.

In block 21 of FIG. 2A, the computing device controller 113 may determine whether or not the user interface 117 has received a peripheral device selection. A user may input the peripheral device selection manually to the computing device 11 by navigating and manipulating the user interface 117. The user interface 117 may include a graphical user interface (e.g., displayed by the display screen 119). The user interface 117 may include a series of mechanical switches, buttons, touch screen sensor (e.g., integrated into the display screen 119), and knobs to enable the computing device 11 to receive input from the user. The peripheral device selection may include information that identifies the particular one of the peripheral devices 13(1)-13(Z) to which lighting effects processing is applied. The computing device controller 113 may limit the receipt of the peripheral device selection by the user interface 117 to the peripheral devices 13(1)-13(Z) that are electrically connected to the computing device 11. When the computing device controller 113 receives the peripheral device selection from the user interface 117, the computing device controller 113 may retain the peripheral device selection in the computing device memory 115.

Block 21 of FIG. 2A may repeat until the computing device controller 113 determines that the user interface 117 has received the peripheral device selection. When the computing device controller 113 determines that the user interface 117 has received the peripheral device selection, the lighting effects processing in FIG. 2A may proceed from block 21 to block 22.

In block 22 of FIG. 2A, the computing device controller 113 may receive an image source selection from the user interface 117. The user may input the image source selection manually to the computing device 11 by navigating and manipulating the user interface 117. The image source selection may include information that identifies an image source. The image source may be a location for the image to be processed by the computing device controller 113 during the lighting effects processing of FIG. 2A. The image source selection may also include a collection of display parameters, such as, for example, brightness, contrast, color temperature, and sharpness, each with particular settings or values appropriate or desired for the lighting effects created by the peripheral device 13(X). For example, as part of inputting the image source selection, the user may indicate (e.g., by entering numerical value, manipulating a graphical slider, etc.) the particular settings of the collection of display parameters.

The brightness parameter may indicate a relative light intensity for the lighting effects emitted by the light array 139 of the peripheral device 13(X). The brightness parameter may be indicated numerically on a scale between a lowest brightness level and a highest brightness level. For example, the brightness parameter may be a value between 1 and 100, with 1 representing the lowest brightness level, and 100 representing the highest brightness level. The peripheral device 13(X), when emitting the lighting effects with the brightness parameter at a higher number, presents the lighting effects in a manner that is brighter (e.g., with a higher intensity) than when the peripheral device 13(X) emits the lighting effects with the brightness parameter at a lower number.

The contrast parameter may indicate an amount of relative difference in luminance between dark and bright areas of the lighting effects emitted by the light array 139. The contrast parameter may be indicated numerically on a scale between a lowest contrast level and a highest contrast level. For example, the contrast parameter may be a value between 1 and 100, with 1 representing the lowest contrast level, and 100 representing the contrast level. The peripheral device 13(X), when emitting the lighting effects with the contrast parameter at a higher number, presents the lighting effects in a manner that has a larger difference in luminance between dark and bright areas of the lighting effects than when the peripheral device 13(X) emits the lighting effects with a contrast parameter at a lower number.

The color temperature parameter may indicate the color of the light of the lighting effects emitted by the light array 139. The color temperature parameter may be indicated using a numerical value on a scale between a lowest color temperature level and a highest color temperature level of the peripheral device 13(X) and may refer to the Kelvin scale. For example, the color temperature parameter may be a value between 2500K (or another Kelvin value) and 6500K (or another Kelvin value), with 2500K representing the lowest color temperature level, and 6500K representing the highest color temperature level. The peripheral device 13(X), when emitting the lighting effects with the color temperature parameter at a higher number, may present the lighting effects in a manner that is viewable as being cooler or more blue-like than when the peripheral device 13(X) emits the lighting effects with a color temperature parameter at a lower number, which may be viewable as being warmer or more yellow-like.

The sharpness parameter may indicate an amount of clarity or edge contrast with which the lighting effects is created on the peripheral device 13(X). The sharpness parameter may be indicated numerically on a scale between a lowest sharpness level and a highest sharpness level. For example, the contrast parameter may be a value between 1 and 10, with 1 representing the lowest sharpness level, and 10 representing the highest sharpness level. The light array 139, when emitting the lighting effects with the sharpness parameter at a higher number, presents the lighting effects in a manner that appears clearer with higher edge contrast between displayed objects (e.g., more distinct contours) than when the peripheral device 13(X) emits the lighting effects with a sharpness parameter at a lower number.

Prior to performing the lighting effects processing of FIG. 2A, the computing device controller 113 may store, into the computing device memory 115, default settings for the collection of display parameters. The default settings may be predetermined values for each of the brightness, the contrast, the color temperature, and the sharpness. In the absence of any of the display parameters in the image source selection, the computing device controller 113 may retrieve any of the default settings from the computing device memory 115 in block 22. The lighting effects processing in FIG. 2A may advance from block 22 to block 23.

In block 23, the computing device controller 113 may determine whether or not the image source selection includes information that identifies (i) computer-generated content as the image source, (ii) displayed content as the image source, or (iii) recorded content as the image source. Computer-generated content is computer-generated imagery that is created electronically by an electronic device and/or with the aid of software. The lighting effects processing in FIG. 2A may advance from block 23 to block 24 when the image source selection includes information that identifies the computer-generated content as the image source.

In block 24, the computing device controller 113 in block 24 may electronically create the computer-generated content. Upon electronically creating the computer-generated content, the computing device controller 113 in block 24 may store the computer-generated content into the computing device memory 115. Alternatively, the computing device controller 113 may store the computer-generated content into the computing device memory 115 prior to advancing the lighting effects processing from block 22 to block 23. In block 24, the computing device controller 113 in block 24 may retrieve the computer-generated content from the computing device memory 115. The computer-generated content may be a single image. The single image may be a still image. The computer-generated content may be a video stream having a plurality of image frames, which each may individually be referred to as an image or image frame. For example, the video stream may include a series of consecutive image frames. While in the computing device memory 115, the computer-generated content may be referred to as convertible image content, discussed in further detail below. Thereafter, the lighting effects processing in FIG. 2A may advance from block 24 to block 26.

Returning to block 23, the computing device controller 113 may determine that the image source selection includes information that identifies content on the display screen 119 (displayed content) as the image source. The content on the display screen 119 may be an image. The image may be a single image in the form of a still image. Alternatively, the image on the display screen 119 may an image frame of a video stream having a plurality of image frames. For example, the video stream may include a series of consecutive image frames. In some examples, the image source selection indicates a portion of the display screen 119 to serve as the image. For example, via the user interface, the computing device controller 113 may receive an area selection of the display screen 119. For example, the area selection may be received in response to a user dragging a cursor (e.g., using a computer mouse) to identify a rectangular sub-section of the display screen area, to a user selecting a window on the display screen 119 (e.g., a window associated with a particular software application currently executing on the computing device controller 113), or to use of other user interface techniques. The area selection may indicate the portion of the display screen 119 that is to serve as the image. Accordingly, in some examples, the area selection may select a window on the display screen 119 that is displaying a video stream or a still image, and the content in the window (e.g., an image frame of the video stream or still image) may serve as the image. The lighting effects processing in FIG. 2A may advance from block 23 to block 25 when the image source selection includes information that identifies the content on the display screen 119 as the image source.

In block 25, the computing device controller 113 may control the display 118 to cause the image on the display screen 119 to appear on the display screen 119 in real-time. The computing device interface 111 may receive the image on the display screen 119 from the computing device memory 115. The computing device interface 111 may receive the image on the display screen 119 from a source external to the computing device 11. The display 118 may display the image on the display screen 119 simultaneously with the computing device interface 111 receiving the image from the computing device memory 115 and/or from the source external to the computing device 11. The computing device controller 113 may store the image on the display screen 119 into the computing device memory 115. The computing device controller 113 may continuously update the computing device memory 115 in real-time to store the image that appears on the display screen 119. While in the computing device memory 115, the image on the display screen 119 may be referred to as the convertible image content, discussed in further detail below. Thereafter, the lighting effects processing in FIG. 2A may advance from block 25 to block 26.

In block 23, the computing device controller 113 may determine that the image source selection includes information that identifies recorded content as the image source. The recorded content may be previously stored in the computing device memory 115 or another computer readable medium, and may be retrieved by the computing device controller 113. For example, the information that identifies the recorded content as the image source may include or indicate a file name and/or memory address at which the recorded content is stored. The computing device controller 113 may retrieve a file that includes the recorded content from a memory based on the file name and/or memory address. The recorded content may be a previously-recorded image and/or a previously-recorded video stream. The previously-recorded image may be a single image. The single image may be a still image. The image may be a Graphics Interchange Format (GIF) image file, a Joint Photographic Experts Group (JPEG) image file, and/or any other image file. The previously-recorded video stream may be a series of consecutive image frames. The previously-recorded video stream is from (e.g., encoded or saved as) a Moving Picture Experts Group (MPEG) video file, and/or any other video file. In some examples, the computing device 11 provides a capture function that enables a user to capture content (e.g., an image or video stream) from the display screen 119 to serve as the recorded content. For example, via the user interface, the computing device controller 113 may receive an area selection of the display screen 119. For example, the area selection may be received in response to a user dragging a cursor (e.g., using a computer mouse) to identify a rectangular sub-section of the display screen area, to a user selecting a window on the display screen 119 (e.g., a window associated with a particular software application currently executing on the computing device controller 113), or using other user interface techniques. The area selection may indicate the portion of the display screen from which to capture an image or video stream. Accordingly, in some examples, the area selection may select a window on the display screen 119 that is displaying a video stream or a still image, and the content in the window (e.g., an image frame of the video stream or still image) may be captured and stored (e.g., in the computing device memory 115) as the recorded content.

While in the computing device memory 115, the recorded content may be referred to as the convertible image content, discussed in further detail below. The computing device controller 113 may store the recorded content into the computing device memory 115 prior to advancing the lighting effects processing from block 22 to block 23. The lighting effects processing in FIG. 2A may advance from block 23 to block 26 when the image source selection includes information that identifies recorded content as the image source.

Accordingly, in some examples, regardless of the image source selection and the path taken from block 23 to block 26, convertible image content may be identified and/or present in the computing device memory 115. For example, the convertible image content may include an image or video stream from computer-generated content, may include an image or video stream from recorded content, or may include an image from displayed content (e.g., being currently displayed on the display screen 119). As noted, in the image from the displayed content may be or include an image frame of a plurality of image frames of a video stream being displayed on the display screen 119.

In block 26 of FIG. 2A, the computing device controller 113 may convert the convertible image content into a lighting control map for the peripheral device 13(X). Specifically, to create the lighting control map, the computing device controller 113 may process the convertible image content to create a color array from the convertible image content. The computing device controller 113 in block 26 of FIG. 2A may convert the color array content into the lighting control map. The computing device controller 113 in block 26 of FIG. 2A may, in real time, generate the lighting control map for the peripheral device 13(X).

Figure 2B:
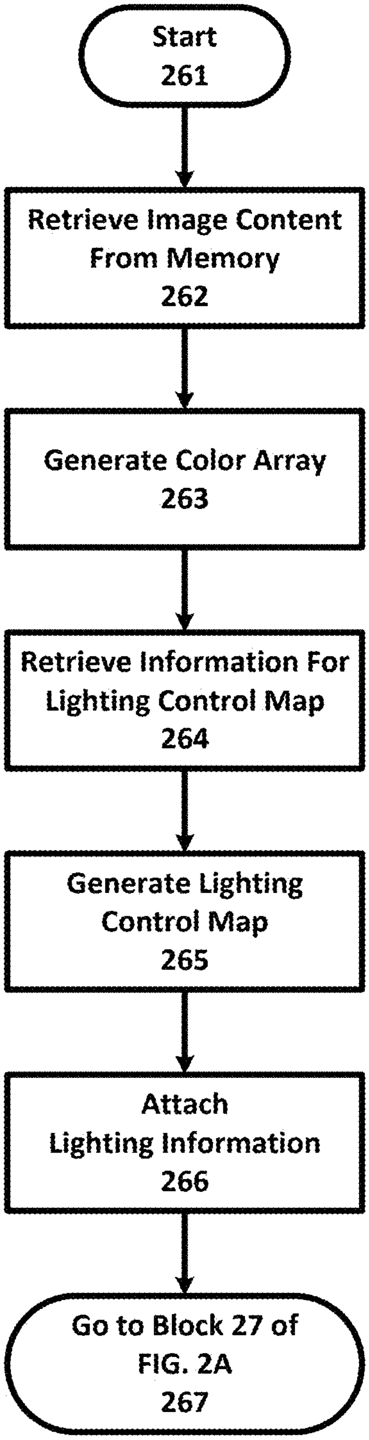
FIG. 2B illustrates a flow diagram for content conversion into a lighting control map, according to examples of the present disclosure.

In some examples, to convert the convertible image content into the lighting control map for block 26, a process as illustrated in FIG. 2B is performed. For example, the conversion in block 26 of FIG. 2A may commence in block 261 of FIG. 2B and proceeds from block 261 to block 262. As illustrated in FIG. 2B, the computing device controller 113 in block 262 may retrieve the convertible image content from the computing device memory 115. Thereafter, the lighting effects processing in FIG. 2B may advance from block 262 to block 263.

In block 263, the computing device controller 113 may process the convertible image content to generate the color array. The computing device controller 113 in block 263 may process the convertible image content to pixelate the convertible image content. The convertible image content in pixelated form is an example of the color array. In the case of the convertible image content including a video stream, each image frame of the video stream may be pixelated to generate a plurality of color arrays (e.g., one color array for each image frame).

Each color array is an array of individual color swatches. Each color swatch in the color array is respectively associated with a portion of the convertible image content. For example, the color array associates the portion of the convertible image content with a color swatch in the color array and associates another portion of the convertible image content with another color swatch in the color array. The matrix of the pixels in the display screen 119 is composed of multiple pixel groups. Each pixel group is a subset of the matrix of the pixels. The pixel group indicates a size for each portion of the convertible image content. The computing device controller 113 may select a dominant color for each portion or pixel group of the convertible image content as the color of the color swatch corresponding to that portion. The dominant color that is selected may be an average color of the pixel group, a most common color in the pixel group, or another color representative of a most dominant color in the pixel group. Thereafter, the lighting effects processing in FIG. 2B proceeds from block 263 to block 264.

In block 264 of FIG. 2B, the computing device controller 113 may retrieve information for the lighting control map. For example, the computing device controller 113 may process the peripheral device selection to identify the peripheral device 13(X) as the particular one of the peripheral devices 13(1)-13(Z) to which lighting effects processing is applied. Also in block 264, the computing device controller 113 may decode the configuration information from the peripheral device 13(X) and extract, from the configuration information, the identification information, and the light array aspect ratio for the peripheral device 13(X). The computing device controller 113 in block 264 may retrieve the display parameters. Thereafter, the computing device controller 113 may advance the lighting effects processing in FIG. 2B from block 264 to block 265.

In block 265, the computing device controller 113 may convert the color array into the lighting control map for the peripheral device 13(X). In the case of a video stream resulting in a plurality of color arrays, each color array may be converted into a respective lighting control map, forming a plurality or stream of lighting control maps. When converting each color array into a lighting control map for the peripheral device 13(X), the computing device controller 113 may, to produce the lighting control map, map the color array to the light array 139 of the peripheral device 13(X). When mapping the color array to the light array 139, the computing device controller 113 may transpose the color array to the lighting control map by adjusting the aspect ratio for the color array from the display screen aspect ratio to the light array aspect ratio, with the display screen aspect ratio being for the display screen 119 and the light array aspect ratio being for the peripheral device 13(X). The light array aspect ratio for the peripheral device 13(X) may become the aspect ratio of the lighting control map. In some examples, the lighting control map may include an array of values in which the values in the array are indicative of a color for each light of the light array 139. For example, each value in the array of values may correspond to a light of the light array 139, and may be a numerical value indicative of a color for that light to emit. Thereafter, the computing device controller 113 may advance the lighting effects processing in FIG. 2B from block 265 to block 266.

In block 266, the computing device controller 113 may attach lighting information to the lighting control map (or maps). The lighting information may include sequencing parameters, a device identifier, and the collection of display parameters. The sequencing parameters may instruct the sequence and color of light emissions from the lights in the light array 139 of the peripheral device 13(X). The device identifier may uniquely identify the peripheral device 13(X) as the particular one of the peripheral devices 13(1)-13(Z) to which the lighting control map is applied. The collection of display parameters may include settings for brightness, contrast, color temperature, and sharpness of the lighting effects created by the peripheral device 13(X).

In some examples of the processing of FIG. 2B, in the case of a video stream to be converted, the computing device controller 113 may convert an initial image frame of the video stream and additional image frames of the video stream (e.g., in sequence) to generate the stream of lighting control maps.

From block 266, the computing device controller 113 may advance the lighting effects processing in FIG. 2B to block 27 in FIG. 2A.

In block 27, the computing device controller 113 may control the computing device interface 111 to output the lighting control map for the peripheral device 13(X) from the computing device interface 111. In the case of the convertible image content including a video stream and being converted into a stream of lighting control maps, in block 27, the computing device interface 111 may output the stream of lighting control maps. The lighting control map(s) that are output may be received by the peripheral device 13(X) via peripheral device interface 131. In response to receipt of the lighting control map(s), the peripheral device 13(X) may control the light array 139 to emit light in accordance with the lighting control map(s), as described in further detail with respect to FIG. 3.

Figure 3:
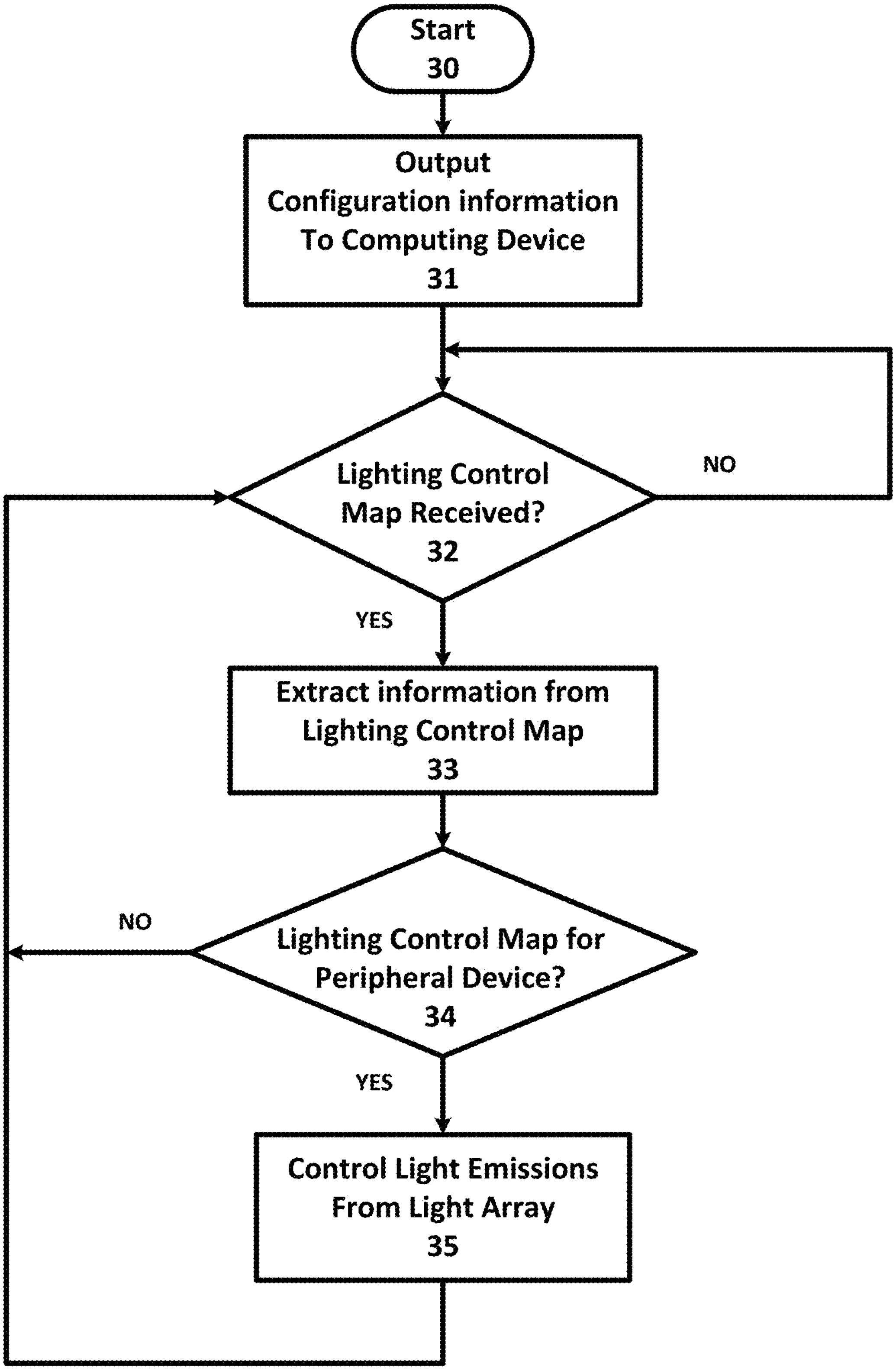
FIG. 3 illustrates a flow diagram for lighting effects processing performed by the peripheral device, according to examples of the present disclosure.

Although the conversion in block 26 and the output in block 27 are illustrated as discrete blocks in FIG. 2A, blocks 26 and 27, like other blocks of FIGS. 2A, 2B, and 3, may be executed at least partially in parallel. For example, in the case of the convertible image content including a video stream, the computing device controller 113 may convert image frames (e.g., an initial image frame and additional image frames) to lighting control maps in sequence. As each lighting control map is created, the computing device interface 111 may output the lighting control map (while conversion of subsequent image frames is being performed). Thus, for example, the computing device interface 111 may output a stream of lighting control maps where, when a first lighting control map is being output, a second lighting control map is being created, then when the second lighting control map is being output, a third lighting control map is being created, so on.

In some examples, in the case of the image source being displayed content (see path from block 23 to block 25 of FIG. 2A), the lighting effects processing of FIG. 2A may loop between blocks 25, 26, and 27 repeatedly or continuously to, in real time, capture a stream of image frames of content (a video stream) being displayed on the display screen 119, convert the stream of image frames to a stream of lighting control maps, and output the stream of lighting control maps to the peripheral device. For example, as content is displayed on the display screen 119, the content may be captured as an image frame in block 25, the image frame may be converted to a lighting control map in block 26, and the lighting control map may be output to the peripheral device 13(X) in block 27. The lighting effects processing of FIG. 2A may then return to block 25 to capture a new image frame from the display screen 119, where the new image frame includes new content being displayed on the display screen 119 (e.g., a next image frame in a video stream). The new image frame may then be converted to a new lighting control map in block 26, and the new lighting control map may be output to the peripheral device 13(X) in block 27. This lighting effects processing of FIG. 2A may again loop back to block 25 and continue through blocks 25, 26, and 27, resulting in a stream of lighting control maps being output to the peripheral device 13(X) based on a stream of image frames (including an initial image frame and additional image frames) captured from changing content (e.g., a video stream) displayed on the display screen 119 over time. The peripheral device 13(X) may control the light array 139 to emit light in accordance with the stream of lighting control maps, resulting in the light array 139 of the peripheral device 13(X) in effect, mirroring the display screen 119. That is, the peripheral device 13(X) may receive the stream of lighting control maps from the computing device 11, and control the lights of the light array 139 to illuminate in accordance with the stream of lighting control maps while the video stream is displaying on the display screen. In some examples, the lighting control map (of the stream of lighting control maps) that is controlling the lights of the light array 139 at a given moment may have been generated by the computing device controller 113 from the same image frame (of the video stream) currently being displayed on the display screen 119. In other examples, a lag of a certain number of frames may exist between the image frame of the video stream being displayed on the display screen 119 and the image frame of the video stream used to generate the lighting control map controlling the light array 139 on the peripheral device 13(X).

The lighting effects processing in FIG. 2A may advance from block 27 to block 28. In some examples, where the processing in FIG. 2A includes looping of blocks 25, 26, and 27 as described above, this looping may further include block 28, where an affirmative determination in block 28 (described below) may cause the loop to be exited and/or where a negative determination in block 28 (described below) may cause the processing 2A to return to block 25 (along a path not shown in FIG. 2A).

In block 28, the computing device controller 113 may determine whether or not the user interface 117 has received a subsequent peripheral device selection from the user interface 117. The subsequent peripheral device selection may include information that uniquely identifies another of the peripheral devices 13(1)-13(Z) to which the lighting effects processing is applied. The user may input the subsequent peripheral device selection manually to the computing device 11 by navigating and manipulating the user interface 117.

When the computing device controller 113 determines in block 28 that the user interface 117 has not received the subsequent peripheral device selection from the user interface 117, the lighting effects processing in FIG. 2A may advance from block 28 to block 22 as illustrated (or to block 25 if the lighting effects processing in FIG. 2A is looping through blocks 25, 26, and 27).

When the computing device controller 113 determines in block 28 that the user interface 117 has received the subsequent peripheral device selection from the user interface 117, the computing device controller 113 retains the subsequent peripheral device selection in the computing device memory 115. While in the computing device memory 115, the subsequent peripheral device selection may become the peripheral device selection in the lighting effects processing of FIG. 2A. Thereafter, the lighting effects processing may advance from block 28 to block 22.

In some examples of the lighting effects processing of FIG. 2A, a block or blocks illustrated in FIG. 2A are bypassed. For example, in some examples, the lighting effects processing may include blocks 20, 26, and 27 of FIG. 2A, while the other blocks are bypassed. In other examples, other combinations of the blocks of FIG. 2A are implemented and bypassed.

FIG. 3 illustrates a flow diagram for lighting effects processing performed by the peripheral device controller 133. In some examples, the peripheral device controller 133 of the peripheral device 13(X) may obtain and execute software or instructions stored in the peripheral device memory 135 to perform the lighting effects processing as illustrated and described with respect to FIG. 3.

The lighting effects processing in FIG. 3 begins at block 30 when the peripheral device 13(X) is electrically connected to and/or in communication with the computing device 11. FIG. 1F illustrates an example where the peripheral device 13(X) is in communication with the computing device 11. The peripheral device 13(X) may be in communication with the computing device 11 when electrically connected by wire or wirelessly to the computing device 11. The lighting effects processing in FIG. 3 may advance from block 30 to block 31.

In block 31 of FIG. 3, the peripheral device controller 133 may control the peripheral device interface 131 to output, from the peripheral device interface 131 to the computing device interface 111, the configuration information for the peripheral device 13(X). The configuration information output from the peripheral device interface 131 may include the light array aspect ratio for the light array 139 of peripheral device 13(X) and identification information that uniquely identifies the peripheral device 13(X). Also in block 31, the peripheral device controller 133 may control the light array 139 to initialize the light array 139. Initializing the light array 139 may include controlling the light array 139 to emit light. Alternatively, initializing the light array 139 may include inhibiting the light array 139 to emit light. Thereafter, the lighting effects processing in FIG. 3 may advance from block 31 to block 32.

In block 32 of FIG. 3, the peripheral device controller 133 may control the peripheral device interface 131 to receive, from the computing device interface 111, a lighting control map for the peripheral device 13(X). For example, the peripheral device controller 133 may receive a lighting control map such as, for example, a lighting control map generated by the computing device 11 executing the lighting effects processing of FIG. 2A described above. The peripheral device controller 133 may determine whether or not the peripheral device interface 131 has received a lighting control map for the peripheral device 13(X). When the peripheral device controller 133 determines in block 32 that the peripheral device interface 131 has not received a lighting control map, the lighting effects processing in FIG. 3 may repeat block 32. Alternatively, when the peripheral device controller 133 determines in block 32 that the peripheral device interface 131 has received a lighting control map, the lighting effects processing in FIG. 3 may advance from block 32 to block 33.

In block 33 of FIG. 3, the peripheral device controller 133 may decode the lighting control map that was received via the peripheral device interface 131. When decoding the lighting control map, the peripheral device controller 133 may extract the lighting information from the lighting control map. The lighting information may include the device identifier, the display parameters, and the sequencing parameters. Thereafter, the lighting effects processing in FIG. 3 may advance from block 33 to block 34.

In block 34 of FIG. 3, the peripheral device controller 133 may determine whether or not the device identifier identifies the peripheral device 13(X). When the peripheral device controller 133 determines in block 34 that the peripheral device 13(X) is unidentified by the device identifier, the peripheral device controller 133 may inhibit further processing of the lighting control map by advancing the lighting effects processing in FIG. 3 from block 34 to block 32. When the peripheral device controller 133 determines in block 34 that the device identifier identifies the peripheral device 13(X), the peripheral device controller 133 may advance the lighting effects processing in FIG. 3 from block 34 to block 35.

In block 35 of FIG. 3, the peripheral device controller 133 may process the sequencing parameters to control the light emissions from the light array 139. The sequencing parameters instruct the sequence and color of light emissions from the lights in the light array 139 of the peripheral device 13(X). When processing the sequence parameters, the peripheral device controller 133 may control the sequence of light emissions from the light array 139. To control the sequence of light emissions from the light array 139 in block 35, the peripheral device controller 133 may generate control signals for controlling each of the lights in the light array 139. Also, when processing the display parameters in the lighting information, the peripheral device controller 133 may control the light array 139 to adjust the brightness, the contrast, the color temperature, and/or the sharpness of light emitted from the light array 139. By processing the sequence parameters and the display parameters, the peripheral device controller 133 may control the light array 139 to illuminate the peripheral device 13(X) in accordance with the lighting control map. Thereafter, the lighting effects processing in FIG. 3 may advance from block 35 to block 32.

In some examples, by looping back to block 32 (and proceeding again through blocks 33, 34, and 35), the peripheral device 13(X) may receive a stream of lighting control maps from the computing device 11 and control the lights of the light array 139 to illuminate in accordance with the stream of lighting control maps. In some examples, such controlling of the light array 139 in accordance with the stream of lighting control maps causes, effectively, streaming of a converted version of the video stream used to generate the stream of lighting control maps (e.g., via lighting effects processing of FIG. 2A) on the light array 139 of the peripheral device 13(X).

Figure 4A:
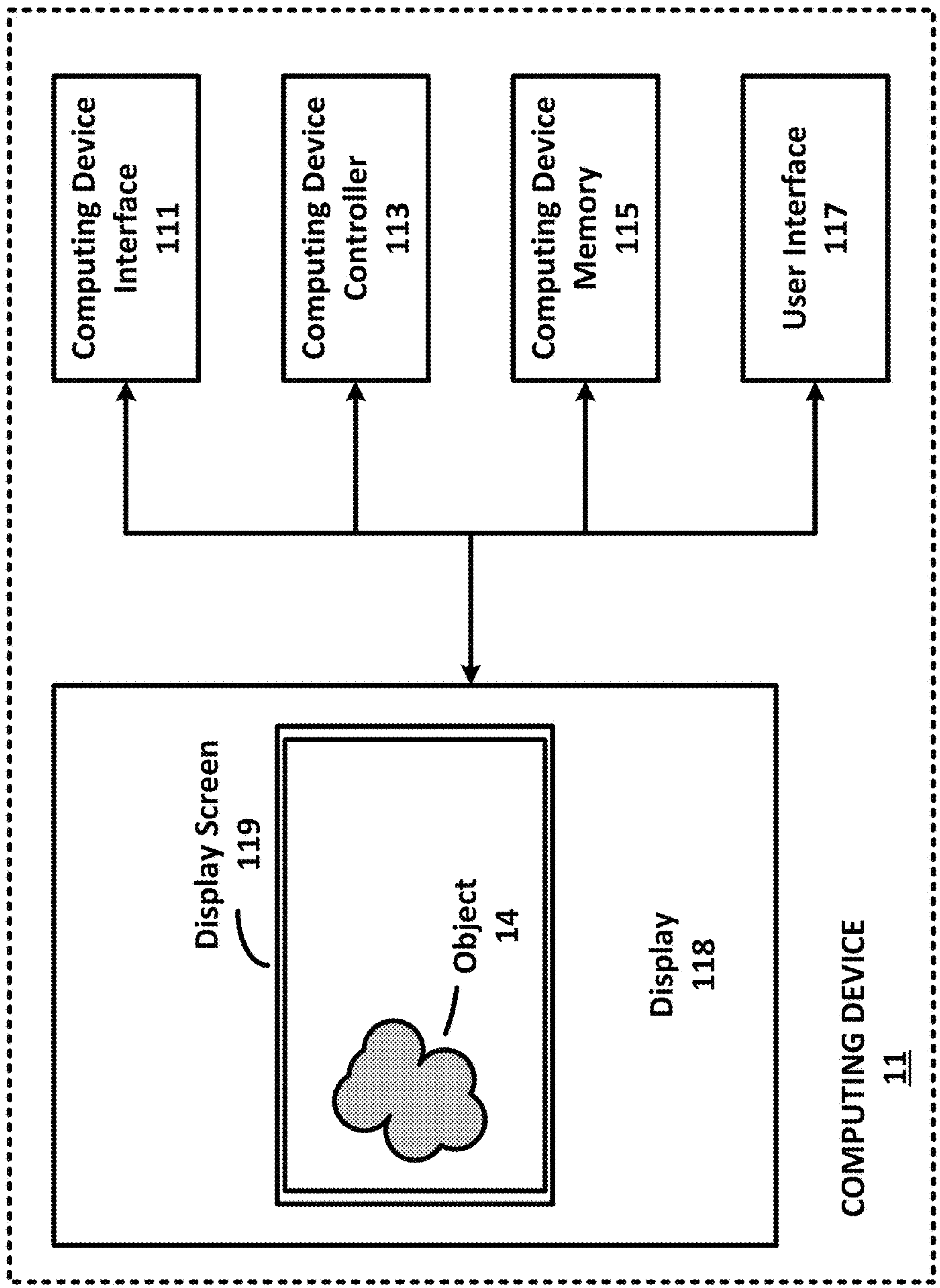
FIGS. 4A and 4B illustrate an example of lighting effects.
Figure 4B:
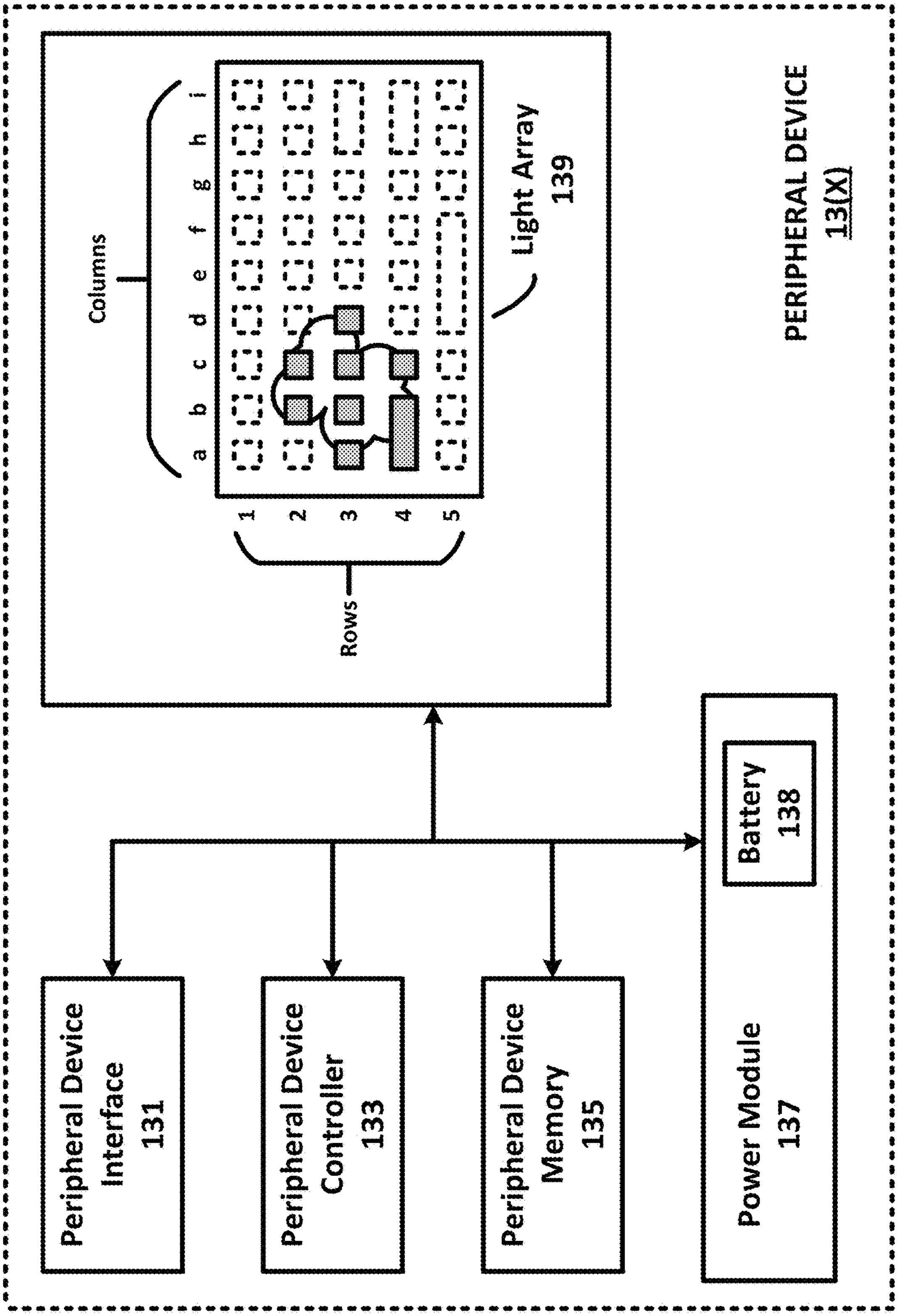

FIGS. 4A and 4B illustrate an example of lighting effects resulting from the lighting effects processing in FIGS. 2 and 3.

An aspect of the lighting effects processing of FIG. 2A is illustrated in FIG. 4A. For example, in FIG. 4A, the computing device controller 113 may control the display 118 to cause content, including an object 14, to appear on a left portion of the display screen 119. The content on the display screen 119 may be an image. The image may be a single image in the form of a still image. Alternatively, the image on the display screen 119 may be an image frame of a video stream having a plurality of image frames. The computing device controller 113 may generate a lighting control map based on the content on the display screen 119 using the lighting effects processing described with respect to FIG. 2A.

An aspect of the lighting effects processing of FIG. 3 is illustrated in FIG. 4B. For example, the peripheral device 13(X) of FIG. 4B may be a keyboard having a matrix of switch keys. Each switch key in the matrix may be a mechanical switch that, when depressed, provides a signal to the peripheral device controller 133. The signal may represent or indicate, for example, a textual character associated with the particular mechanical switch, for example, an alphanumeric character, punctuation, or another character. The signal may encode, for example, a code according to the American Standard Code for Information Interchange (ASCII) or another standard. The mechanical switch may be a keycap switch. A respective light of the light array 139 may be incorporated into each switch key. Accordingly, the light array 139 in FIG. 4B may include or be incorporated into a matrix of switch keys. The matrix of switch keys may be arranged to have columns s(1)-s(M) and rows t(1)-b(N) as illustrated in FIG. 1E. In the example of FIG. 4B, the peripheral device controller 133 may receive the lighting control map generated by the computing device controller 113 of FIG. 4A. The peripheral device controller 133 may then control the light array 139 to cause an illumination of switch keys 2-b, 2-c, 3-a, 3-b, 3-c, 3-d, 4-ab, and 4-c on a left portion of the light array 139 such that the illumination of the light array 139 depicts a representation of the object 14 displayed on the left portion of the display screen 119.

Figure 5A:
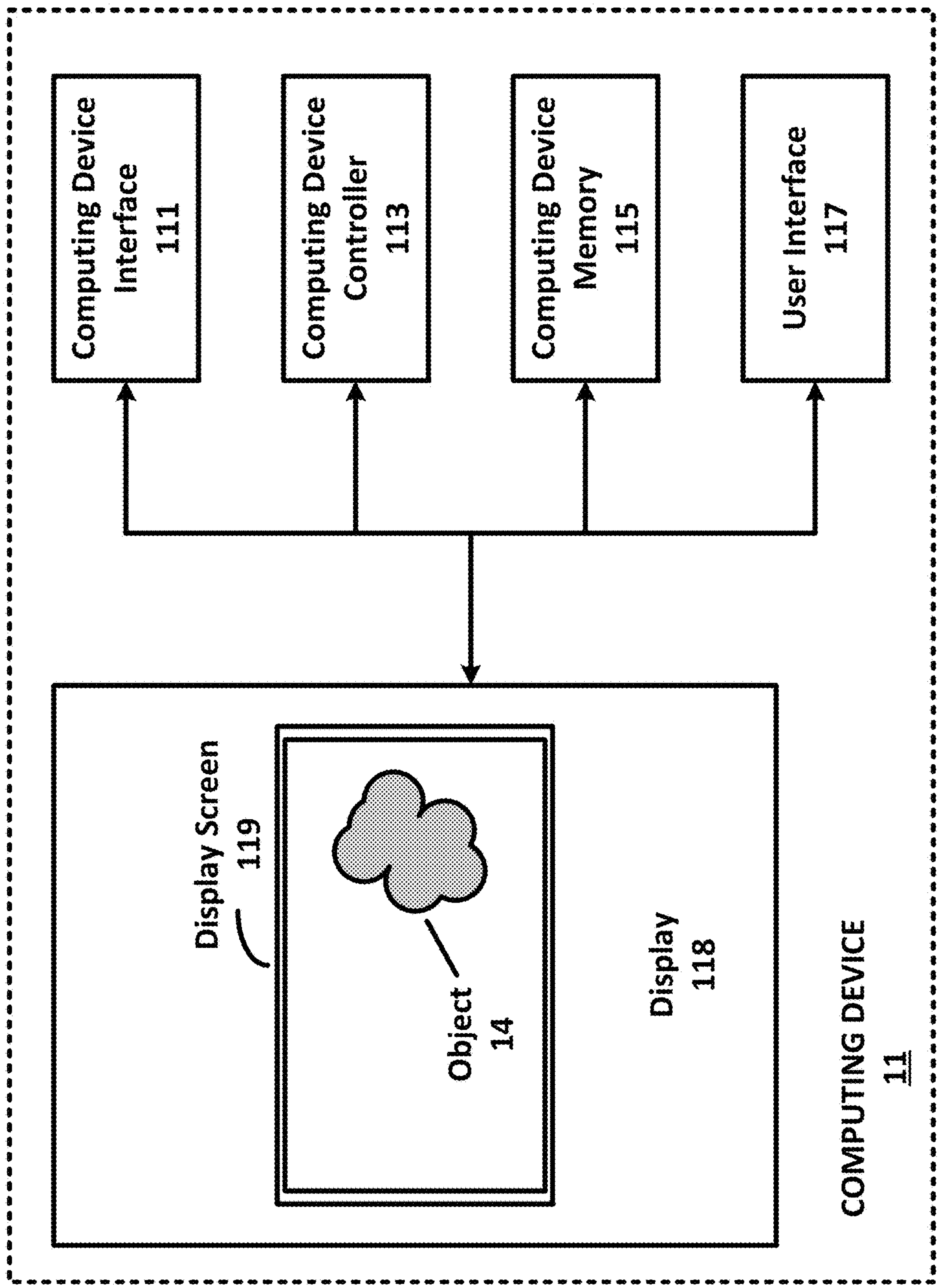
FIGS. 5A and 5B illustrate an example of lighting effects.
Figure 5B:
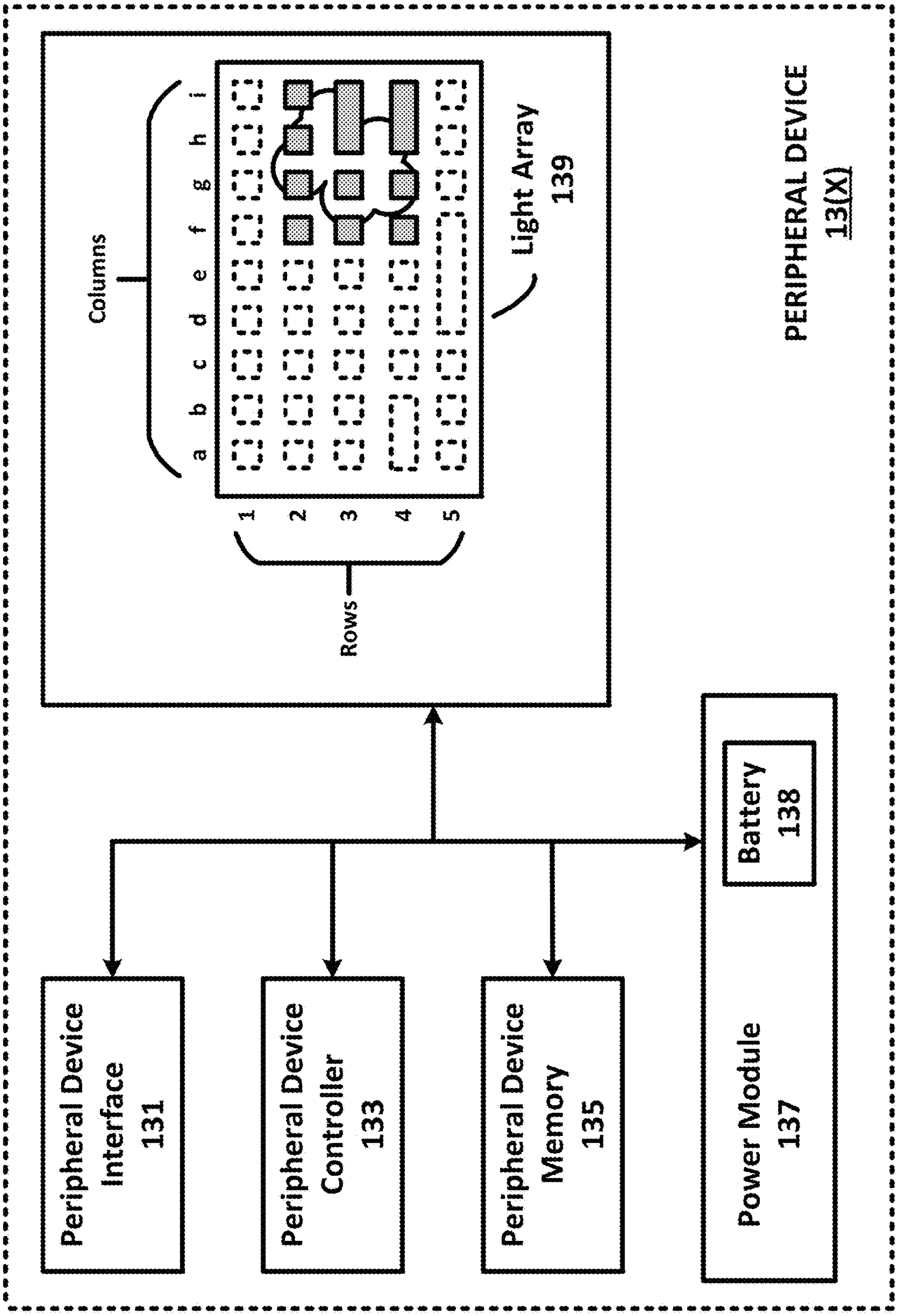

FIGS. 5A and 5B illustrate another example of lighting effects resulting from the lighting effects processing in FIGS. 2A and 3. For example, in FIG. 5A, the computing device controller 113 may control the display 118 to cause content, including the object 14, to appear on a right portion of the display screen 119. The content on the display screen 119 may be an image. The image may be a single image in the form of a still image. Alternatively, the image on the display screen 119 may be an image frame of a video stream having a plurality of image frames. The computing device controller 113 may generate a lighting control map based on the content on the display screen 119 using the lighting effects processing described with respect to FIG. 2A.

Another aspect of the lighting effects processing in FIG. 3 is illustrated FIG. 5B. The light array 139 in FIG. 5B includes the matrix of switch keys, as described with respect to FIG. 4B. For example, in FIG. 5B, the peripheral device controller 133 may receive the lighting control map generated by the computing device controller 113 of FIG. 5A. The peripheral device controller 133 may then control the light array 139 to cause an illumination of switch keys 2-f, 2-g, 2-h, 2-gi 3-f, 3-g, 3-hi, 4-f, 4-g, and 4-hi on a right portion of the light array 139 such that the illumination of the light array 139 depicts a representation of the object 14 displayed on the right portion of the display screen 119.

In some examples, aspects of the technology, including computerized implementations of methods according to the technology, may be implemented as a system, method, apparatus, or article of manufacture using standard programming or engineering techniques to produce software, firmware, hardware, or any combination thereof to control a processor, also referred to as an electronic processor, (e.g., a serial or parallel processor chip or specialized processor chip, a single- or multi-core chip, a microprocessor, a field programmable gate array, any variety of combinations of a control unit, arithmetic logic unit, and processor register, and so on), a computer (e.g., a processor operatively coupled to a memory), or another electronically operated controller to implement aspects detailed herein.

Accordingly, for example, examples of the technology may be implemented as a set of instructions, tangibly embodied on a non-transitory computer-readable media, such that a processor may implement the instructions based upon reading the instructions from the computer-readable media. Some examples of the technology may include (or utilize) a control device such as, e.g., an automation device, a special purpose or programmable computer including various computer hardware, software, firmware, and so on, consistent with the discussion herein. As specific examples, a control device may include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, may be executed in different orders than are expressly illustrated or described, as appropriate for particular examples of the technology. Further, in some examples, certain operations may be executed in parallel or partially in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer may be a component. A component (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that may be present in any variety of combinations, rather than an exclusive list of components that may be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "only one of," or "exactly one of."

In the description above and the claims below, the term "connected" may refer to a physical connection or a logical connection. A physical connection indicates that at least two devices or systems co-operate, communicate, or interact with each other, and are in direct physical or electrical contact with each other. For example, two devices are physically connected via an electrical cable. A logical connection indicates that at least two devices or systems co-operate, communicate, or interact with each other, but may or may not be in direct physical or electrical contact with each other. Throughout the description and claims, the term "coupled" may be used to show a logical connection that is not necessarily a physical connection. "Co-operation," "the communication," "interaction" and their variations include at least one of: (i) transmitting of information to a device or system; or (ii) receiving of information by a device or system.

Any mark, if referenced herein, may be common law or registered trademarks of third parties affiliated or unaffiliated with the applicant or the assignee. Use of these marks is by way of example and shall not be construed as descriptive or to limit the scope of disclosed or claimed embodiments to material associated only with such marks.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the application, ordinal numbers (e.g., first, second, third, etc.) may be used as an adjective for an element (i.e., any noun in the application). Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application.

Unless otherwise indicated, like parts and method steps are referred to with like reference numerals.

Although the present technology has been described by referring to certain examples, workers skilled in the art will recognize that changes may be made in form and detail without departing from the scope of the discussion.

What is claimed is:

1. A system comprising:

a computing device that is electronically connectable to a peripheral device, wherein the computing device is to:

receive, from a user interface, an image source selection, the image source selection identifying an image, convert the image into a lighting control map, and output the lighting control map to the peripheral device.

2. The system according to claim 1, wherein the computing device is to:

convert the image into the lighting control map while displaying the image on a display screen of the computing device.

3. The system according to claim 1, wherein the peripheral device is to:

receive the lighting control map from the computing device; and control lights of a light array of the peripheral device to illuminate in accordance with the lighting control map.

4. The system according to claim 3, wherein the peripheral device is a keyboard and comprises switch keys, and the light array is incorporated into the switch keys.

5. The system according to claim 3, wherein the peripheral device is at least one selected from a group of a computer mouse, a headset, a speaker, a microphone, a lamp, a computer tower, a fan, a heatsink, a memory module, or a liquid cooling pump.

6. The system according to claim 1, wherein the image is an image frame of a video stream having a plurality of image frames, wherein the computing device is to:

display the video stream on a display screen of the computing device;

convert additional image frames of the plurality of image frames into a stream of lighting control maps; and output the stream of lighting control maps to the peripheral device; and wherein the peripheral device is to:

receive the stream of lighting control maps from the computing device; and control lights of a light array of the peripheral device to illuminate in accordance with the stream of lighting control maps while the video stream is displaying on the display screen.

7. The system according to claim 1, wherein the image is an image frame of a video stream having a plurality of image frames, wherein the computing device is to:

convert additional image frames of the plurality of image frames into a stream of lighting control maps; and output the stream of lighting control maps to the peripheral device; and wherein the peripheral device is to:

receive the stream of lighting control maps from the computing device; and control lights of a light array of the peripheral device to illuminate in accordance with the stream of lighting control maps.

8. The system according to claim 7, wherein the computing device is to:

receive an area selection of a display screen of the computing device indicating a portion of the display screen; and capture content displayed on the portion of the display screen as the plurality of image frames.

9. The system of claim 1, wherein the computing devices is further to:

identify the peripheral device; and in response to identifying the peripheral device, control light emissions from a light array of the peripheral device, based on the lighting control map.

10. A non-transitory computer-readable medium to store machine-readable instructions that, when executed by a computing device, causes the computing device to:

convert an image into a lighting control map, the image is an image frame of a video stream having a plurality of image frames;

output the lighting control map to a peripheral device to control lights of a light array of the peripheral device to illuminate in accordance with the lighting control map;

convert additional image frames of the plurality of image frames into a stream of lighting control maps; and output the stream of lighting control maps to the peripheral device to control lights of the light array of the peripheral device to illuminate in accordance with the stream of lighting control maps.

11. The non-transitory computer-readable medium of claim 10, wherein the instructions, when executed by the computing device, cause the computing device to:

convert the image into the lighting control map while displaying the image on a display screen of the computing device.

12. The non-transitory computer-readable medium of claim 10, wherein the instructions, when executed by the computing device, cause the computing device to:

display the video stream on a display screen of the computing device;

and output the stream of lighting control maps to the peripheral device to control lights of the light array of the peripheral device to illuminate in accordance with the stream of lighting control maps while the video stream is displaying on the display screen.

13. The non-transitory computer-readable medium of claim 10, wherein the instructions, when executed by the computing device, cause the computing device to:

receive an area selection of a display screen of the computing device indicating a portion of the display screen; and capture content displayed on the portion of the display screen as the plurality of image frames.

14. A method comprising:

connecting a computing device, electronically, to a peripheral device;

receiving an area selection of a display screen of the computing device indicating a portion of the display screen to serve as an image;

converting, by the computing device, the image into a lighting control map; and outputting, by the computing device, the lighting control map to a peripheral device.

15. The method according to claim 14, comprising:

converting the image into the lighting control map while displaying the image on a display screen of the computing device.

16. The method according to claim 14, comprising:

receiving, by the peripheral device, the lighting control map from the computing device; and controlling, by the peripheral device, lights of a light array of the peripheral device to illuminate in accordance with the lighting control map.

17. The method of claim 14, wherein the image is an image frame of a video stream having a plurality of image frames, the method comprising:

displaying the video stream on a display screen of the computing device;

converting, by the computing device, additional image frames of the plurality of image frames into a stream of lighting control maps;

outputting the stream of lighting control maps to the peripheral device;

receiving, by the peripheral device, the stream of lighting control maps from the computing device; and controlling, by the peripheral device, lights of a light array of the peripheral device to illuminate in accordance with the stream of lighting control maps while the video stream is displaying on the display screen.

18. The method of claim 14, wherein the image is an image frame of a video stream having a plurality of image frames, the method comprising:

converting additional image frames of the plurality of image frames into a stream of lighting control maps;

outputting the stream of lighting control maps to the peripheral device; and controlling, by the peripheral device, lights of a light array of the peripheral device to illuminate in accordance with the stream of lighting control maps.

19. The method of claim 18, wherein the video stream is from a video file retrieved from a memory.

20. The method of claim 14, wherein the area selection is a rectangular subsection of the display screen area of the display screen.

* * * * *